Jan. 8, 1957 E. E. LAKSO 2,776,833
AUTOMATIC POWER-DRIVEN TAPE SERVING MACHINE
Filed Oct. 18, 1951 8 Sheets-Sheet 2

Inventor
Eino E. Lakso
By Emery, Booth, Townsend, Miller & Weidner
Attys.

Jan. 8, 1957  E. E. LAKSO  2,776,833
AUTOMATIC POWER-DRIVEN TAPE SERVING MACHINE
Filed Oct. 18, 1951  8 Sheets-Sheet 4

Inventor
Eino E. Lakso
By Emery, Booth, Townsend, Miller & Weidner
Att'ys

Jan. 8, 1957   E. E. LAKSO   2,776,833
AUTOMATIC POWER-DRIVEN TAPE SERVING MACHINE
Filed Oct. 18, 1951   8 Sheets-Sheet 6

Jan. 8, 1957     E. E. LAKSO     2,776,833
AUTOMATIC POWER-DRIVEN TAPE SERVING MACHINE
Filed Oct. 18, 1951     8 Sheets-Sheet 8

Inventor
Eino E. Lakso
By Emery, Booth, Townsend, Miller & Widner
Attys.

United States Patent Office
2,776,833
Patented Jan. 8, 1957

2,776,833
AUTOMATIC POWER-DRIVEN TAPE SERVING MACHINE

Eino E. Lakso, Fitchburg, Mass., assignor to Nashua Corporation, a corporation of Massachusetts Application October 18, 1951, Serial No. 251,920

16 Claims. (Cl. 271—2.4)

This invention relates to machines and devices for feeding, adhesively conditioning, cutting off and delivering desired lengths of strip and tape material from supplies thereof. More particularly it concerns that class of machines commonly known as strip servers or tape dispensers for handling paper and the like tape, especially of the dry gummed variety for use in package sealing and similar purposes, as represented for example in the patents of T. R. Gautier Nos. 2,082,733, 2,192,132, 2,290,041, 2,293,433 and 2,352,149, which patents illustrate tape dispensers of the semi-automatic class wherein operation is effected by movement of a manual lever. A main object of the present invention is to provide a tape dispensing machine for the general purpose indicated and wherein the several operations of advancing, conditioning and severing the desired length of tape, which length may be selected and varied at the will of the operator, are power actuated as by means of an electric motor. In this sense the machine of the invention will be referred to as "automatic" or "full automatic," each tape length feed and cut-off cycle resulting automatically merely by actuation by the operator of a starter or switch. The invention further includes tape feed length control provisions such that the length not only may be selected to meet the particular requirement, but may be changed at will even during progress of an operating cycle.

In the drawings illustrating one embodiment of the invention by way of example.

Referring to the drawings in more detail the machine comprises a frame or housing including laterally spaced left and right side frames 1 and 2 removably secured in assembled relation by cross members and fastening screws 3. The machine as illustrated is designed to be portable and to be supported as by cushioned feet 4 on a horizontal supporting surface such as a counter or shipping room table.

Figure 3:
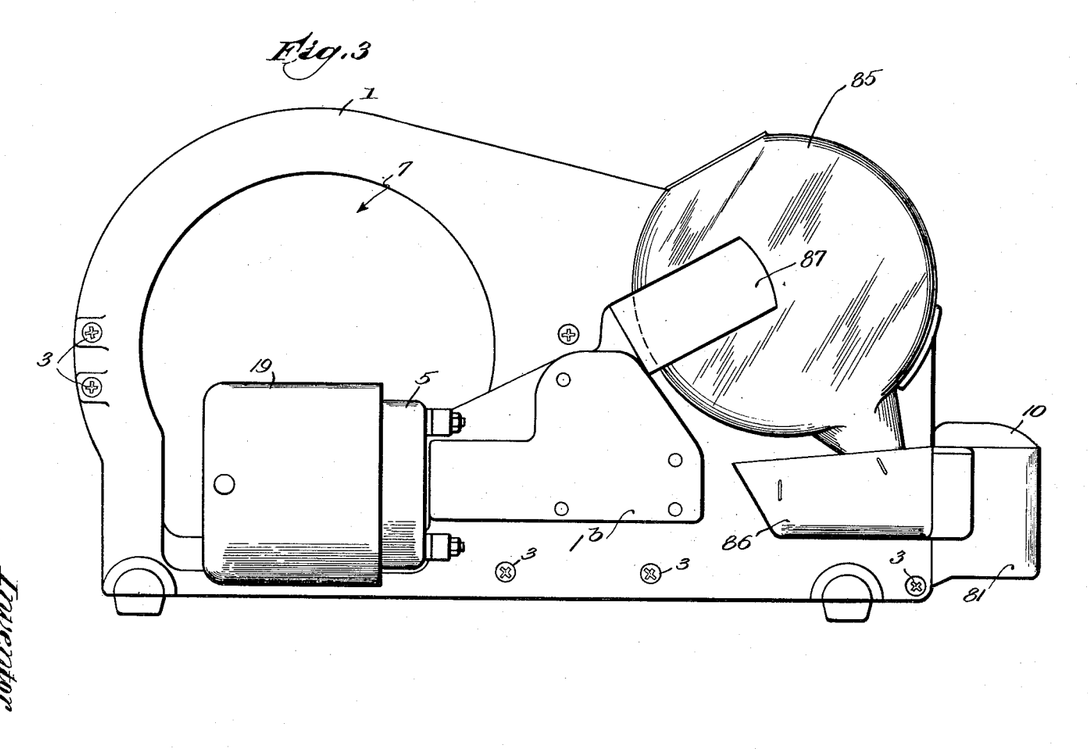
Fig. 3 is a left side elevation.
Figure 8:
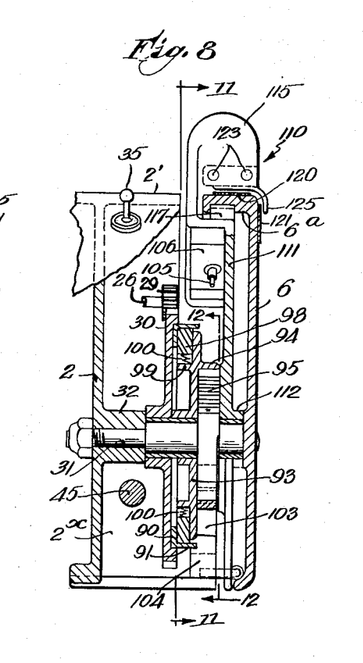
Fig. 8 is a view mainly in vertical transverse section, corresponding to the right portion of Fig. 7.
Figure 10:
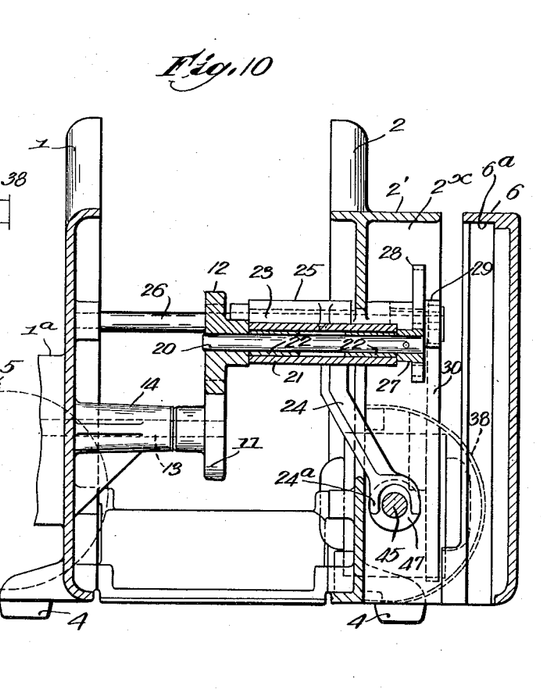
Fig. 10 is a vertical section at a transverse plane behind that of Fig. 9 and on line 10—10 of Fig. 4, with parts of the length selector element removed.

While the several main elements of the machine may be variously located and arranged upon the housing, it has been found convenient and promotive of a well balanced and sturdy construction to locate the prime mover such as the electric motor 5 at one side of the machine, herein at the left, and a major portion of the control mechanism at the other side, herein at the right, mainly within a mechanism compartment 2x defined partly by a lateral flange 2' on the side frame 2 and a side cover plate 6; see Figs. 8 and 10. For convenience in description the respective sides of the machine may be referred to as the motor side and the control side. While these are the left and the right sides in the illustrated example, viewing the machine from the front, that is from the left of Figs. 1 and 4 and the right of Fig. 3, obviously the location of the motor and of the control means may be transposed or otherwise arranged.

The rear portion of the machine housing provides between the side frames 1, 2 a well 7 for a supply of the tape in roll form, in position to be drawn upon. The tape from the roll supply is adapted to pass forwardly over a guide roll 8, Fig. 4, and thence forwardly along a guide plate or channel 9 including an overlying guide 9x to and past the cutter element 70 to be referred to, see also Fig. 9, and along a feed guide means or throat 9a so as to pass in moisture-receiving relation across a capillary moistener 80 whence it is presented across a delivery guide 10.

The tape is advanced by a pair of rotary feed rolls or wheels 11, 12, one of which is power driven and the other of which is herein bodily movable to and from feeding relation with the tape passing between the rolls. For convenience the driven roll 11 will sometimes be referred to as the lower or rear roll and the other roll 12 which is rotated with the movement of the tape will be called the upper, forward or measuring roll, it being understood that within the invention the tape path at the feeding means may be horizontal, vertical or at an intermediate angle substantially as shown.

Figure 6:
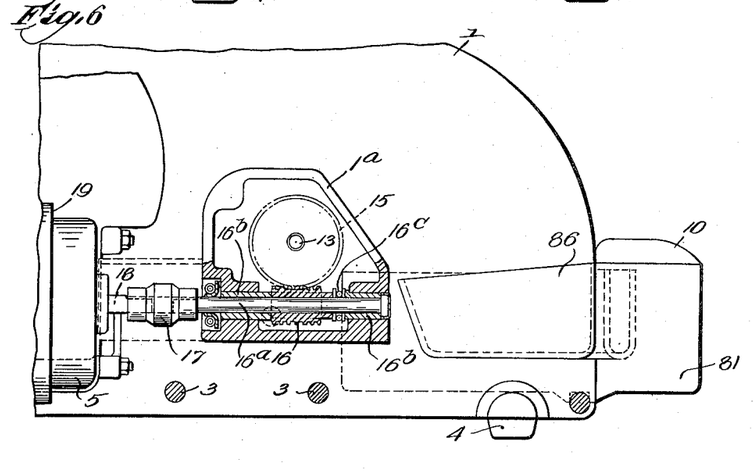
Fig. 6 is a left side elevation of a forward portion of the machine with a gear cover plate removed.

The power-driven and herein lower roll 11 is fixed at the inner end of a short transverse shaft 13 extending but about half-way across between the side frames 1, 2, the shaft having a bearing boss 14 at the inner face of the left side frame 1, the shaft extending out through the side frame 1 and into a gear compartment defined by a lateral enclosing flange 1a at the outer face of said side frame 1, Figs. 6 and 10. This compartment normally is closed by a cover plate 1b, Fig. 3.

Noting particularly Fig. 6, the outer end of the shaft 13 within the gear compartment 1a carries a worm wheel 15 meshing with a worm 16 fast on a longitudinal shaft 16a journalled in thickened wall portions of the gear compartment 1a, preferably with interposed oilless bushings 16b and a supporting and thrust-receiving ball bearing 16c. Between the gear compartment 1a and the motor 5 and in position normally to be enclosed by the cover plate 1b, Fig. 3, a demountable coupling 17 connects the worm shaft 16 to the adjacent end of the output shaft 18 of the motor 5. As best seen in Figs. 3, 5, 6 and 7, the motor is enclosed within a ventilated and demountable cover and shield 19.

Thus powered feeding rotation is accorded to the lower feed roll 11 from the motor 5 and through the worm and worm gear 16, 15. The latter are designed to effect appropriate speed reduction from the selected motor such as to advance the tape at the desired speed. The feed is accomplished by reason of the opposing engagement of the driven feed roll 11 and the non-driven feed roll 12 with the respective faces of the tape as the latter passes between them. In preference to starting and stopping the motor 5 for each feed cycle, provision is herein made for starting and stopping the feed through the bodily relative movement of the feed rolls 11, 12 to and from a mutual feeding relation.

Figure 4:
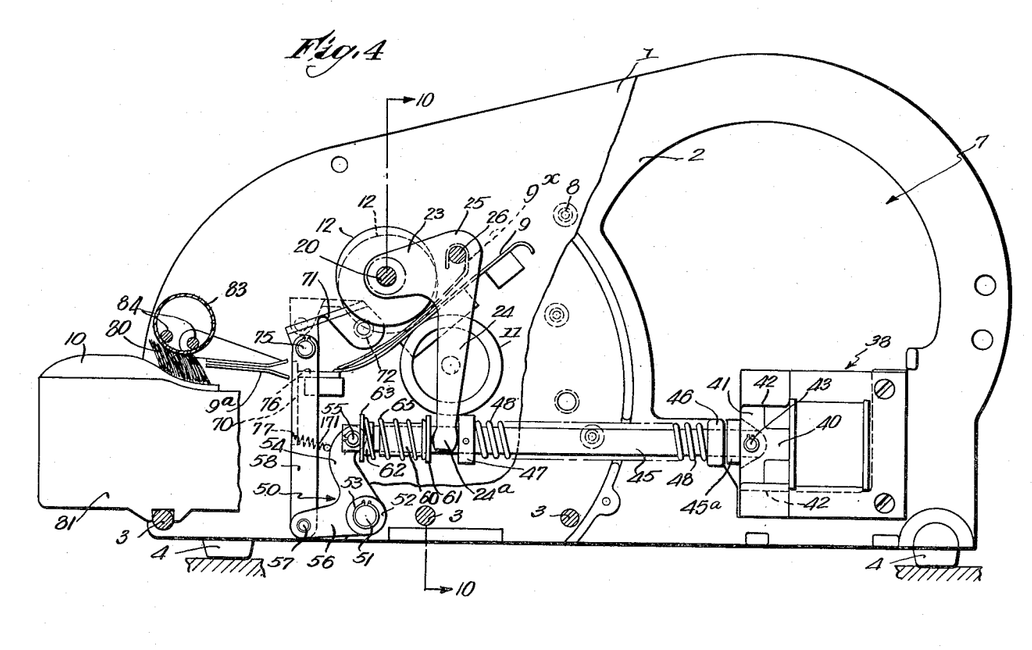
Fig. 4 is an elevational view again looking onto the right side as in Fig. 1, with cover elements removed and the front portion of the right side frame broken away to expose the feeding, moistening and severing means.
Figure 5:
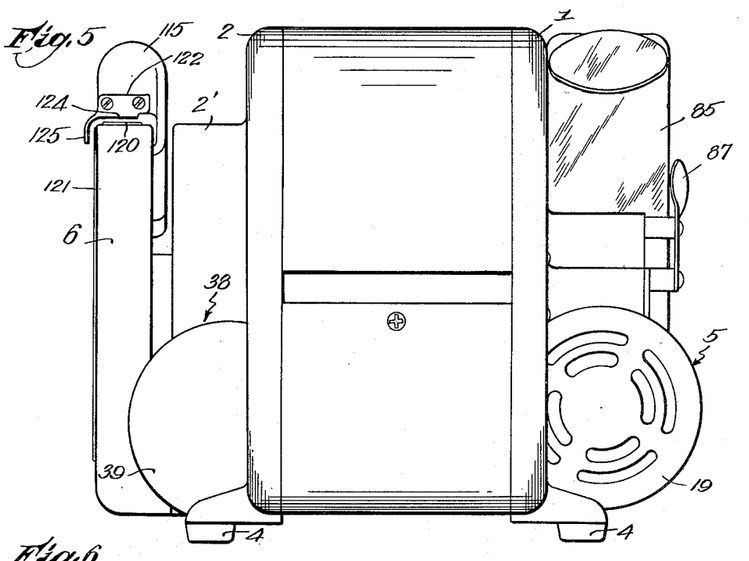
Fig. 5 is a rear end elevation of the same machine.

Accordingly in the illustrated example, Figs. 4 and 10, the upper or measuring roll 12 is fixed at the inner end of a transverse cross shaft 20 journalled in a sleeve 21 containing interposed oilless bushings 22. This bearing sleeve 21 is carried at the forward end of the upper arm 23 of a bell crank of which the other arm 24 extends downwardly and laterally, terminating in a forked portion 24a which straddles the actuator rod 45 to be referred to. The roll-carrying bell crank 23, 24 includes an intermediate hub 25 by which it is supported for rocking movement about the axis of a fixed horizontal cross shaft 26 on the side frames 1, 2 and extending into the mechanism compartment 2x at the right of the machine, Fig. 10. In Fig. 4 the upper feed roll 12 is shown in full line in the raised inactive or non-feeding position. Movement of the generally vertical arm 24 of the roll-supporting bell crank rearwardly and toward the right in Fig. 4, counterclockwise about the shaft 26, will shift the feed roll 12 down into tape feeding relation with the lower and driven roll 11, in the broken-line position of Fig. 4.

As earlier indicated the invention makes provision for variably selecting the lengths of tape to be delivered and for enabling the operator not only to preselect the desired length within the given range but also to change the feed length as desired, even while a feed cycle is in progress. This object is herein carried out by the medium of feed length selector means together with automatic cycle control means whereby for each feeding cycle the feed is halted and severance effected when the desired tape length has been advanced.

Figure 12:
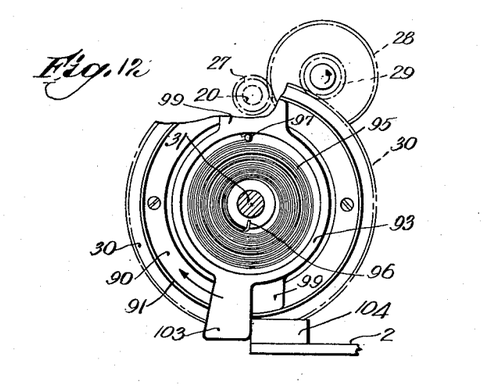

Such selective and automatic length control is herein had by an accurate measuring action in which the upper feed roll 12 is utilized as the initial or primary measuring element. The lineal travel of the circumferential surface of the upper feed roll 12 and consequently also the angular motion thereof afford a direct measure of the length of tape advanced in any given cycle. For translating this length-measuring rotation of the feed roll 12 into a proportionate movement of a feed-stopping length-control element, the rotary shaft 20 of this feed roll has fixed at its outer end in the compartment 2x, see Figs. 10 and 12, also Fig. 14, a pinion 27 meshing with an intermediate gear 28 rotatably mounted on the cross shaft 26 previously mentioned. Said intermediate gear has concentrically fixed with it a smaller pinion 29 meshing with a large gear 30 rotatable on a stud 31 in a lateral boss 32 on the machine side frame 2, Fig. 8.

The gear 30 together with parts associated with and moving with it constitutes a length control element having a reduced angular movement directly proportional to the length of tape fed between the active feed rolls 11 and 12. The described gear train between the upper or measuring feed roll 12 and this length control element or gear 30 effects a substantial reduction, this being such that the maximum available predeterminedly-measured feed length for the given machine, up to say 72 inches or more, is proportionately expressed by not more than one full 360° rotation of the gear 30, herein somewhat less.

Turning now to the means whereby the feeding action is begun and ended for each cycle and the tape cut off, this will now be described with reference particularly to Fig. 4, also Figs. 9 and 10. The establishment of a feeding status for the feed roll pair 11, 12, and subsequent interruption thereof, as already explained, is herein had by bodily movement of the upper or measuring roll 12 of the pair, by rocking of the roll-carrying bell crank 23, 24 about its pivotal axis 26. This action is herein accomplished automatically under the control of the operator, by means of the actuator rod 45 previously mentioned.

This actuator rod 45 is bodily movable lengthwise in one direction, herein rearwardly or toward the right in Fig. 4, at the beginning of a cycle and reversely in terminating the cycle. For so operating it there is employed in the illustrated example a solenoid 38 installed on the right side frame 2, herein within a removable cover 39, Figs. 1 and 5.

Returning to Figs. 4 and 10, the armature 40 of the solenoid 38 includes a cross head 41 slidable in a fixed guide 42. The rear end of the actuator rod 45 is demountably coupled to the solenoid armature 40, 41 as by means of a pin and lock ring as indicated at 43. It is guided and slidably supported intermediately as by an apertured bearing lug 46 on the adjacent side frame 2, being further supported at the front end by connection to the cutter bell crank 50 to be referred to. As previously mentioned, the vertical arm 24 of the upper roll-carrying bell crank has a forked lower end 24a which straddles the actuator rod 45. Rearwardly of said bell crank arm 24 the actuator rod has adjustably fixed on it a collar 47. A relatively strong coil spring 48 surrounds the rear and intermediate portions of the actuator rod 45, the spring thrusting at its front and rear ends respectively against said collar 47 and the bearing lug 46. The spring 48 is designed for installation under some tension and the collar 47 is so located with respect to the spring and to the bell crank arm 24 of the roller 12 that in normal or non-operating status, with the solenoid 38 deenergized, the actuator 45 stands toward the front of the machine, i. e., toward the left in Fig. 4, with the bell crank 23, 24 shifted clockwise and the upper feed roll 12 lifted to the full-line non-feeding position. The actuator rod 45 is so shifted in the stopping or non-feeding direction and there maintained by the action of the spring 48 upon de-energizing of the solenoid 38 to end an operating cycle. Forward return travel of the actuator is limited and cushioned by a bumper washer 45a thereon engageable with the fixed bearing lug 46 on the machine frame.

Figure 9:
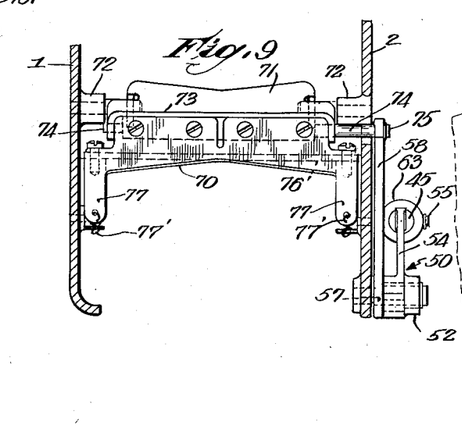
Fig. 9 is a partial vertical cross-section showing the tape severing means.

Referring still to Figs. 4 and 10, also Fig. 9, the actuating connections for the tape severing means also are associated with the actuator rod 45, at the forward portion thereof, said rod serving commonly in the operation of the feed and of the tape-severing knife or cutter mechanism. Such cutter connections herein comprise a cutter bell crank element designated generally at 50 rockably supported on a short stud on the adjacent right side frame 2, the bell crank having an intermediate hub 52 received on the stud and demountably held as by a clip 53. The generally vertical arm 54 of this bell crank is pivotally connected at the upper end to the front end of the actuator rod 45 as by means of the removable pivot pin and retainer clip 55. The other and generally horizontal arm 56 of the cutter bell crank 50 is pivoted at its front end as at 57 to the lower end of a vertical cutter link 58.

The cutter element proper, best seen in Fig. 9, comprises a movable blade 70 of the guillotine type, such as that of said Patent 2,192,132, mounted for vertical movement with a supporting carrier designated generally at 71. This carrier is pivotally supported at the rear portion in opposed bosses 72 on the respective machine side frames 1 and 2. The movable blade 70 is adjustably secured as by screws to a cross bar 73 having journals 74 at each end pivotally received by downturned side portions on the blade carrier 71. The journal 74 at the right is extended as at 75 for pivotal connection with the upper end of the vertical cutter link 58 previously described.

The movable blade 70 cooperates with a fixed blade 76 across which the advancing tape is directed, and is biased toward the latter for good shearing action, as by springs 171 anchored on the respective side frames and connected to leg portions 77 of the blade 70. As seen in Figs. 4 and 9 the movable blade 70 in the normal or inactive position there shown lies across the path of the tape, in what would be a feed blocking position in the absence of provision whereby the blade is cleared from the tape path preliminarily and preparatory to each feeding action, herein by initial upward motion. The connections between the blade and the actuator rod 45 are constructed and arranged positively to effect the initial preparatory path-clearing action for the blade, herein upwardly, in the interval within which the feed roll 12 is brought into feeding relation to the driven roll 11.

Noting Fig. 4, there is slidably disposed on the front portion of the actuator rod 45 and in front of the arm 24 of the roll operating bell crank a sleeve 60 having at the rear end a circumferential flange 61 adapted to abut the lower end 24a of said arm. In front of the sleeve 60, to the left in Fig. 4, the actuator rod 45 carries a collar 62 with an annular flange 63 held on the rod as by abutment with the connecting pin 55 of the knife bell crank 50. A second coil spring 65 surrounds the slidable sleeve 60 and the end collar 62, and has opposite thrust bearing with and between the flanges 61, 63 thereof.

The shorter spring 65 maintains a tension on the roll-moving crank arm 24, in the roll-closing direction. It insures that the movable feed roll 12 in the retracted feed-actuating position of the actuator 45 is held in proper feeding relation with the driven roll 11 so as to advance the tape but is yieldably so held. For this purpose the sleeve 60 and actuator 45 have capacity for relative longitudinal movement, and the flange 61 of the sleeve is held by the spring 65 in thrusting contact with the roll arm 24 regardless of the extent of retraction of the actuator 45. This obtains even if the fixed collar 47 on the actuator is withdrawn from actual contact with the roll arm 24 in the energized tape-feeding position, as is sometimes desirable to avoid solenoid chatter. The spring 65 thus enforces the tape-gripping feed relation of the rolls 12 and 11, with capacity for the roll 12 to give or yield in the yieldably closed status thereof, to accommodate possible irregularities in the tape and generally enchance the feeding action.

The described operating connections between the cutter blade 70 and the actuator rod 45 also are proportioned and arranged so that upon automatic de-energizing of the solenoid 38 when the selected tape length has been delivered the knife 70, being positively connected to the actuator by the bell crank and linkage 50, 58, has a slight non-cutting descent from its maximum elevated position before making cutting engagement with the tape. During that interval the compression on the relatively strong return spring 48 is relieved, the fixed collar 47 on the actuator rod 45 makes direct positive thrust against the lower end of the roll-carrying arm 24 under return advance of said actuator, with immediate interruption of the feeding relation between the rolls 11 and 12 and return separation thereof to the Fig. 4 position. Accordingly forward movement of the tape is halted and the tape is at rest or substantially so as the knife 70 completes its tape severing descending action.

The described operations with respect to the feed rolls and the knife, both at the beginning and at the end of a cycle, take place rapidly and in extremely close succession, start of the feed immediately succeeding the clearing of the blade and conversely tape severance immediately occurring when the desired tape length has been advanced. Through the described means including the actuator 45 and the dual spring assembly and other parts associated therewith, free delivery and severance of the tape is had regardless of the length selected or of the rapidity with which one operating cycle follows another at the will of the operator. Also, as will more fully appear in connection with the feed length control, the disclosed construction and arrangement is particularly adapted for making available to the operator maximum selectivity as to tape lengths especially including the obtaining of random lengths at the will and selection of the operator.

As indicated the present invention includes feed length selector means operable over a wide range of length selection with maximum flexibility to change lengths at random, together with automatic cycle control means making provision for automatic halting of the feed at the selected length and cutting off of the desired tape length advanced. Such means is herein associated with the described gear train driven from and synchronously with the upper feed wheel 12 acting as the primary measuring member and terminating in the large gear 30 in the lateral compartment 2x at the right side of the machine, Figs. 7 and 8. This selector device and automatic control will now be described, having particular reference to said Figs. 7 and 8, and Figs. 11 and 12.

Said gear 30 carries at the outer face a friction drive plate 90 having a peripheral flange 91. Free on the same stud 31 with the gear 30 and drive plate 90 is a trip member 93 in constantly engaged yieldable friction driving relation to the plate 90 so as normally to turn with the latter through its less than 360° rotation per cycle. This trip member 93 which constitutes a moving part of the rotary feed-length control element has a central disc portion at the outer face of which a lateral annular flange 94, Fig. 8, defines a housing drum for a convolute spring 95 of the clock type. The inner end of this spring is anchored as at 96, Fig. 12, to an enlargement on the stationary stud 31, while the outer end is fastened to the trip member 93 as at 97.

Figure 11:
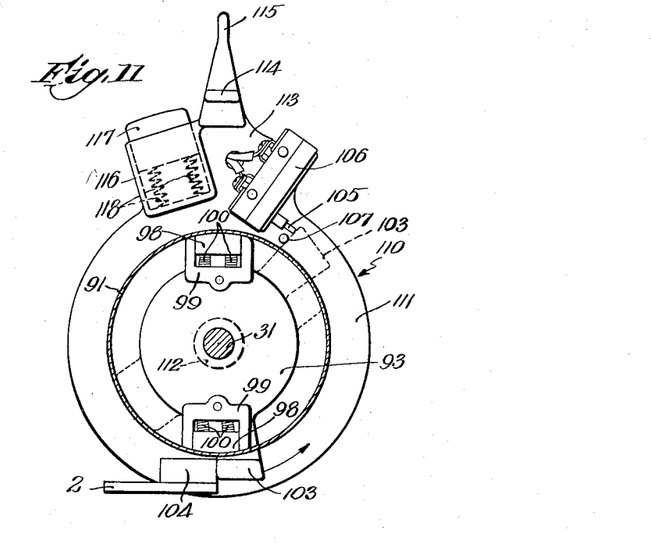
Figs. 11 and 12 are longitudinal vertical sections on the lines 11—11 and 12—12 of Fig. 8, looking in opposite directions illustrating features of the length setting and control assembly.

At the peripheral portion of the other and inner face of the trip 93, toward the left on Fig. 8 and as seen in Fig. 11, resilient frictional gripping means continuously yieldably drivingly related to the drive plate 90, by contact with the circumferential flange 91 thereof. Such means as illustrated is disposed at diametrically opposite locations on the trip and comprises at each location a rubberous shoe 98 in a cup-like radial guide 99 formed on or secured to the disc portion of the trip 93 and biased radially outward by springs 100.

The drum-like trip element 93 carries a radial projection or finger 103 constituting the trip proper for determining the starting and knock-off positions for the feed length control.

Through the described continuously engaged frictional drive connections 98—100 the trip member 93 affixed to the outer end of the clock spring 95 will under all normal operations be driven as a unit with the gear 30. During the active feed of tape this unit is rotated in one direction, herein counterclockwise as viewed in Fig. 11 and clockwise as seen in the opposite-facing view Fig. 12, the latter being a section viewed from the right of Fig. 8. During the feed operation the rotary movement of the trip member 93 is in the direction to tension wind the spring 95. When the tape to the desired length has been fed in any given operating cycle, automatic de-energizing of solenoid 38 and resultant separation of the feed rolls 11, 12 releases this rotary length measuring mechanism including the trip member 93 for return to a zero starting position under the influence of the clock spring 95, it being noted that the non-driven roll 12 operated from the tape and from which said trip member 93 is driven is, upon separation of the feed rolls, entirely free to turn reversely for this purpose.

The zero positioning for start of each tape feed and the control of the feed stopping action is determined by the radial finger 103 of the trip member 93. In the inactive zero or starting position of the parts as shown in full line in Figs. 11 and 12, said trip finger 103 stands against a fixed but preferably adjustable stop 104 on the machine frame 2. In the course of an operating cycle the finger 103 turns with the trip 93 and gear 30 away from the stop 104 under the described length-measuring action. Movement continues until the finger 103 operatively engages and actuates the trip button 105, Figs. 8 and 11, of a micro-switch 106 carried on a rotatively adjustable length selector element designated generally at 110. Said selector element comprises a circular or segmental plate 111 having a hub bearing 112 for turnably supporting it on the stud 31. A laterally projecting pin or similar stop 107 is provided on the selector 110 for positively limiting the movement of the finger 103 just beyond the point of switch-actuating contact with the switch button 105, relieving the latter of the finger stopping pressure. The switch 106 acts to trigger a main circuit control, Fig. 13, whereby the solenoid 38 is de-energized to stop the drive of the feed wheels and effect severance of the delivered length of tape.

At an outer portion of the length selector body 111 is a bracket-like extension 113 mounting the described switch 106 and having a radial projection in the form of a finger piece or length setter 115. By merely shifting this hand lever or setter 115 the operator may at any time pre-set the machine for delivery of any desired tape length within the maximum range, or may change the length selection. This latter may be accomplished either between operating cycles or while a cycle is actually in progress and is short of the previous length setting.

The selector element 110 with the setter or hand lever 115 is held set in the selected position, subject to shifting at any time in either the length increasing or decreasing direction, by releasable holding engagement with a fixed portion of the machine, herein the side cover plate 6 previously referred to. This cover includes an annular flange 6a, Figs. 8 and 10, in general matching relation to the flange 2' on the side frame 2 but spaced therefrom to provide a slot for travel of the setter lever 115. Noting Figs. 8 and 11, within the space defined by the cover flange 6a the bracket portion 113 of the selector element 110 is formed with a socket 116 carrying a shoe 117 urged outwardly as by underlying springs 118 into gripping relation with the arcuate underface of said cover flange 6a. The selector 110—115 is thereby held in any circumferential position to which it may be moved by the operator but may instantly be shifted manually.

Figures 1, 2:
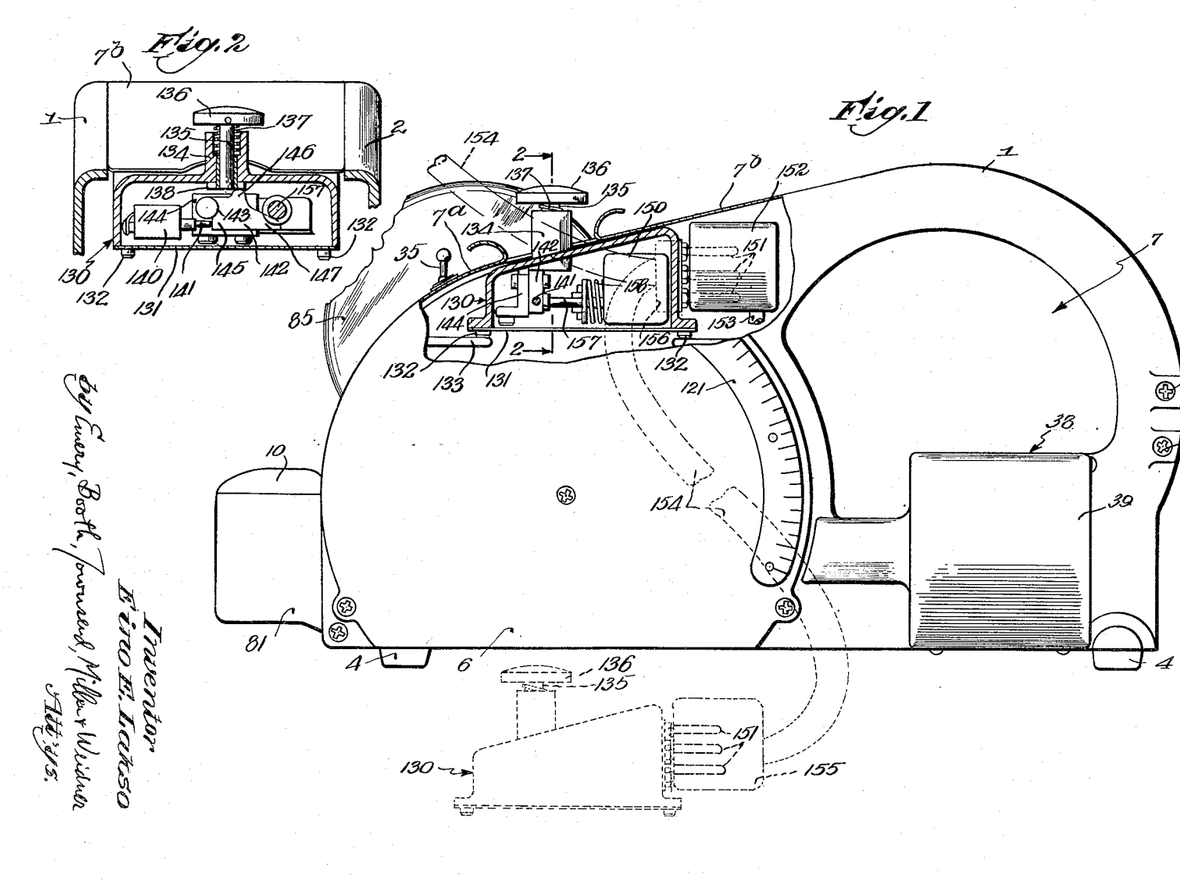
Fig. 1 is a right side elevation of the automatic tape dispenser with a portion of the right side frame broken away to show a cycle control means.
Fig. 2 is a cross-section as on the line 2—2 of Fig. 1 further showing said means.

For readily selecting any tape length within the available limits of the particular machine, which may be for example from say 4 to 72 inches, one or more scales or indices are provided against which index or pointer means on the selector may easily be read. In the illustrated example a plurality of such scales are supplied, calibrated in inches or fractions thereof or other length units. One such scale or index is placed circumferentially about the outer face of the cover flange 6a as at 120, Figs. 7 and 8, where it is conveniently visible to an operator facing the front or delivery end of the machine. Another and corresponding or other scale 121, seen also in Fig. 1, is affixed at the outer face of the cover 6 adjacent the margin thereof. The setter 115 carries suitable indices cooperable with the respective scales 120 and 121. These are herein commonly provided by a single piece detachably secured to the setter lever 115 as by screws 123, Fig. 8, said index piece including an edge index or indicator 124, Fig. 7, moving over and readable against the flange-carried scale 120 and a radially inturned pointer 125 cooperating with the outer scale 121.

Noting particularly Fig. 4, it is understood that the lengths of tape as selected are advanced by the feed means along the guide 9, 9x through the throat means 9a and across the moistener or capillary applicator 80 shown as an inverted brush projecting from a removable reservoir 81 and being of appropriate thickness or extent in the feeding direction to condition adhesively the contacted face of the tape at the feed rate employed, which may be rapid. Moistening coaction with the tape is assured by a depressor engaging the other face of the tape in the region opposite the brush. A preferred form for such depressor, as shown, is a deep-floating hollow tubular element 83 surrounding locating means or cross bars 84, as disclosed and claimed in Patent No. 2,565,451 to Robert W. Hoitt, dated August 21, 1951. Replenishment and automatic liquid level maintenance at adjustable levels desirably is provided, Figs. 1, 3, 5 and 7, as by an inverted bottle or flask-like container 85 of the barometric feed type variably positioned in a lateral extension 86 of the reservoir 81 and held in a resilient bracket 87 on the left side frame 1, all in a manner which may be generally similar for example to that of Gautier Patent No. 2,352,149 earlier mentioned.

Referring now to Figs. 1 and 2, control of the machine whereby each automatically completed feed, moistening and severance cycle may be instituted at the will of the operator is provided by means constructed, arranged and located for easy access and actuation. Desirably and as herein shown it is of a universal nature, for operation manually or by foot and through means which may be directly associated with the machine either or or adjacent the housing thereof or alternatively apart from the machine more or less remotely, whether on the table or counter supporting the machine or upon the floor convenient to the operator's foot, or by a person at any desired distance from the machine.

Such cycling control means as illustrated comprises a starter box or controller designated as a whole at 130. It has a generally rectangular box-like enclosure with the top wall inclined to parallel the upper edges of the side frames 1, 2, the bottom being closed by a removable plate 131. This starter box is adapted to be installed upon the machine as in the full line position of Fig. 1, see also Fig. 7, in the central space at the upper forward portion of the machine side frames 1, 2 where feet 132 on the bottom of the starter box are arranged to stand on horizontal supporting ledges 133 on the respective side frames, the box being further held by insertion of the contact prongs 151 in the block 152 on the machine, again referred to later. On the top wall of the starter box 130 is a vertical tubular boss 134 surrounding an aperture in the wall, and housing a plunger 135 with a head 136 shaped and dimensioned for easy depressing either by hand or by foot. Noting Fig. 2, the plunger 135 is normally held up by a coil spring 137 seated in an enlargement at the upper end of the bore of the boss 134. Upward movement of the plunger is limited by lateral projection 138 at the lower end engageable against the top wall of the starter box.

Figure 7:
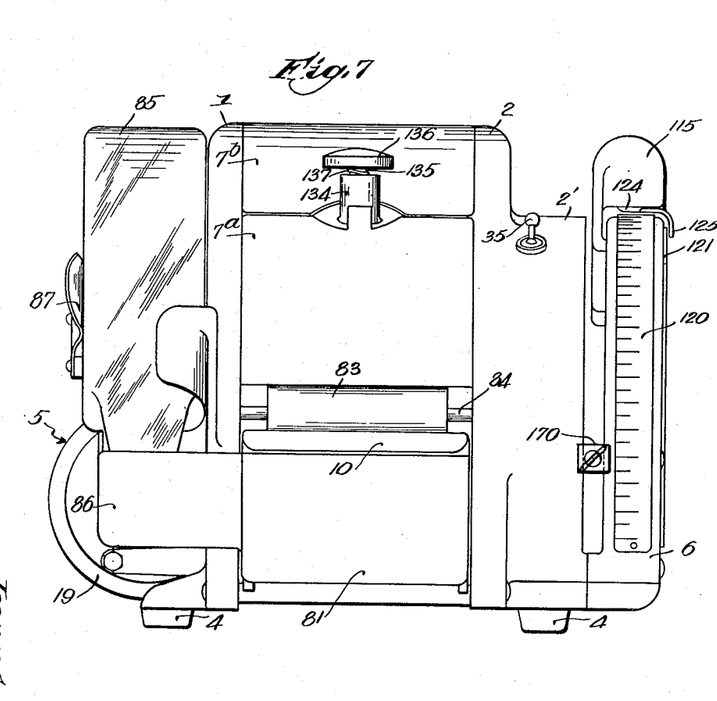
Fig. 7 is a front end elevation of the machine.

In the installed position of the starter box on the machine as in Figs. 1 and 2 it is substantially closed in and concealed beneath the front and rear top covers 7a, 7b of the machine which seat on channels along the top edges of the respective side frames and cover over the main longitudinal compartment between them including the tape supporting well 7 at the rear. As best seen in Fig. 7 these top covers are divided in transverse line with the plunger boss 134 and are notched at their adjacent transverse edges to provide clearance for it. The rear cover portion 7b opens upwardly and backwardly, being pivotally mounted at the rear as upon one of the cross bars 3 connecting the side frames. The mating front cover portion 7a opens by swinging forwardly about a pivotal support at the front which support may be the forward cross bar 84 of the tape moistener depressor 83, Fig. 4. The adjacent free ends of the covers may have finger grips such as shown in Fig. 1 for convenience in lifting them.

The starter box 130 as seen in Figs. 1 and 2 houses a micro-switch 140 for series connection in a circuit containing the main actuating solenoid 38 for opening the tape-cutter knife and closing the feed rolls. It also contains a small tripper solenoid 150 for serial connection with the micro-switch 105, 106 of the length selector element. This tripper solenoid 150 in the starter box 130 functions to release the switch 140 and de-energize the main solenoid 38 when the selected length of tape has been fed.

Figure 13:
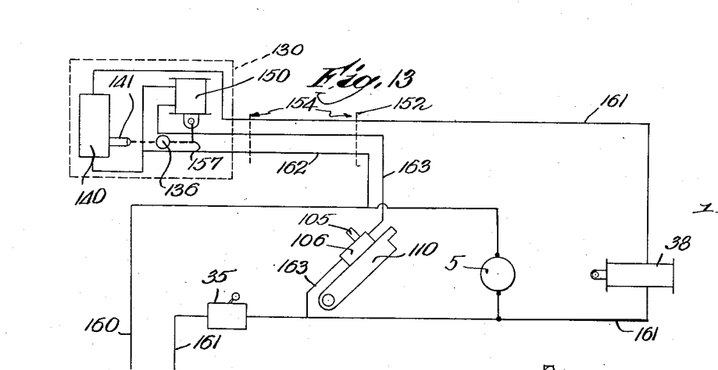
Fig. 13, on the sheet with Figs. 9 and 10, is a wiring diagram for the machine of Figs. 1 to 12.

To provide for ready bodily removal of the starter box 130 as a unit for placing it at whatever desired location for use, the electrical connections for the two circuits containing the start-stop micro-switch 140 and the tripper solenoid 150 are of the detachable plug-in type. As shown, see Fig. 1, the rear wall of the starter box 130 has a plurality of rearwardly projecting contact prongs 151, three in this instance, one of the lines being common to the two circuits as seen in Fig. 13. These starter-box connection prongs are insertible in a plug block and junction box 152 mounted between the machine side frames 1, 2 and having the conductors for the several circuits appropriately connected therein. Power from any outside supply enters the machine through the usual flexible conductor cord, the rear end of which is indicated at 153, Fig. 1, the other end of the cord being equipped for plugging in to any available electrical supply outlet.

When it is desired to operate the machine pedally or more or less remotely, the starter box 130 is bodily removed from the location as shown in Figs. 1 and 2 by merely opening the top covers 7a, 7b, withdrawing the contact prongs 151 from the plug block 152 and lifting the starter box out of its housing well. It then may be set anywhere apart from the machine, for example, on the floor as suggested in the dotted showing in Fig. 1. For connecting the starter box in such more or less remote control operative position there is provided a flexible three-conductor cable 154, Fig. 1, having at one end a plug block 155 corresponding to the block 152 on the machine and adapted to receive the triple prongs 151 on the starter box 130, the cable having at the other end a three-pronged plug 156 for connective insertion into the plug block 152. Obviously the distance at which the machine may be operatively controlled is limited only by the length of the auxiliary cable 154, the latter generally supplied with the machine at least in the length for convenient placing of the starter box on the floor for pedal control of the machine set on a shipping room wrapping table or the like.

The starter box 130 further contains means whereby following depression of the plunger 135—136 the latter may immediately be released by the operator and the starter switch 140 will remain closed for the duration of the operating cycle, until automatically tripped open by the trip solenoid 150 to end the cycle at the desired length of tape delivery. Such means as illustrated is partly mechanical and comprises a switch-operating dog 142 vertically rockable about a horizontal pivot as at 143 on a mounting block 144 within the starter box 130. The dog 142 has a heel 145 opposite and adapted to press or oppositely release the spring-pressed switch-operating push pin 141 of the micro-switch 140. The dog 142 further has an upwardly projecting shoulder 146 directly beneath and adapted to be engaged by depression of the plunger 135 so as to swing the dog 142 clockwise in Fig. 2 into closing relation with the micro-switch 140. At the end opposite the switch finger 141 the dog 142 has a projecting bevel-ended finger 147 for camming engagement with a cooperating cam formation at the outer end of the armature bar 157 of the trip solenoid 150. The latter is urged outwardly, toward the left in Fig. 1, by a spring 158. Upon depression of the plunger 135 to start a cycle the dog 142 and the armature bar 157 make camming interengagement under the influence of the relatively strong spring 158, whereby the dog 142 is held down in the switch closing position. Subsequent energizing of the trip solenoid 150, which need be only instantaneous by actuation of the length control micro-switch 105—106 at the end of a feed cycle, retracts the armature bar 157, toward the right in Fig. 1, releasing the dog 142 for return to normal up position under action of the push pin 141 and its own spring forming a part of the micro-switch 140, thereby re-opening the latter.

The machine desirably incorporates a master switch at a conveniently available point, herein shown at 35, Figs. 1 and 7, as of the tumbler type disposed at the upper front portion of the machine as on the lateral flange 2' of the right side frame 2. As evident in Fig. 13 the master switch 35 is connected in series with the motor 5 and provides for shutting off the latter and all power to the machine at such times when the machine is not in use. It also enables the operator at any time to shut off the power and quickly terminate a cycle at any stage thereof.

Referring now to the wiring diagram, Fig. 13, the plug-in power supply cord is indicated at 153, including the two main leads 160 and 161. The motor 5 is connected in a main circuit across the leads 160, 161 and in series with the master switch 35. A second circuit termed the actuating solenoid circuit, for the main solenoid 38 indicated at the right in Fig. 13 comprises a parallel extension of the line 161 through said solenoid 38 and to one side of the manually or foot closable starter switch 140 and from the latter through a lead 162 to the other side 160 of the power line. This circuit is closed at the normally open starter switch 140 at the start of an operating cycle so as to energize the solenoid 38 for clearing the cutter knife and closing the feed rolls. It remains closed throughout the operating cycle and until opened to terminate the same.

A third circuit termed the automatic length control and cycle-terminating or trip circuit comprises a conductor 163 extending from the lead 161 and through the micro-switch 106 upon the rotating length selector element 110 and from said switch 106 to one terminal of the trip solenoid 150 in the starter box 130. The other side of said trip solenoid 150 is connected to the common return lead 162 previously mentioned. The micro-switch 106 on the length measuring element 110 is normally open but is momentarily closed by actuation of the switch 106 upon arrival of the rotating measurer finger 103 at the tape length setting, thereby energizing the trip solenoid 150 so as to cause the armature 157 thereof to be shifted in a manner releasing the operating pin 141 of the micro-switch 140. Under this triggering action said starter and stopping switch 140 returns to its normal open position as between operating cycles. Thereby the main solenoid 38 is de-energized, the feed rolls 11, 12 separate and halt the feed and the knife 70 is moved to cut off the length of tape fed.

While the motor 5 may be otherwise connected, for example in the circuit with the start-stop switch 140, it is illustrated in Fig. 13 as remaining continuously in operation so long as the master switch 35 is closed. Thus when a number of lengths of tape are to be supplied in the course of a more or less extended working interval, for example during an entire working period in a packing and shipping room, the power-driven feed roll 11 and the substantially noiseless worm gearing connections thereof to the motor remain in operation through such working period. Hence only a minor additional load is imposed on the motor during the intermittent operating cycles of delivering and cutting off selected lengths of adhesively conditional tape from the supply. Accordingly the machine is instantly in readiness so long as the master switch 35 is closed to supply power, successive tape lengths being available in quick succession, as rapidly as they can be handled by the operator.

The quick-adjustable automatic length control mechanism as disclosed is sensitive and accurate. By merely swinging the finger piece or setting lever 115 of the length selector 110 in one or the opposite direction along the length-unit indexed scales 120, 121 any length of tape may be selected within the maximum range. Any desired number of successive same lengths may be had automatically merely by leaving the selector 110—115 at the determined point upon the scales, or when desired the feed length may be changed after any one or more deliveries. Further, the elected length may be reduced even during progress of a cycle and up to the moment when the knock-off finger 103 of the rotary measuring element 90—93 is about to arrive at its position (dotted in Fig. 11) corresponding to the selected length set. For packaging purposes, in handling a considerable number of uniform packages requiring more or less standard tape lengths, assisting stop means may be provided in association with the manual lever 115 of the selector 110, as indicated for example at 170 on Fig. 7. Such stops, of which there may be one or preferably two, may be adjusted to any desired length indication along the fixed carrying part such as the flange 2' or the side cover 6, to assist the operator in readily shifting as between different lengths. When not desired they may be removed or merely loosened and dropped to the end of the setting slot along which they are movable.

The important advantage afforded in the universally adjustable continuous friction drive feature of the length-measuring trip element 93—103 in conjunction with the length-selector element settable at any time to any position within the total length range available, and being shiftable by tape-length increments of any desired size, gives the operator the maximum as to length. He may obtain repeat lengths and random lengths as circumstances may require. He may at any time, even during the course of an operating cycle, extend the intended length indefinitely merely by holding down the starter button or plunger 136 so that the solenoid 38 remains energized beyond whatever knock-off position had been set for the selector trip switch 105—106. In such operation the drive-plate 90 although remaining in contact with the yieldable friction shoes 98 of the trip 93, readily overruns them for such continued feeding of random or indefinite lengths and so long as the operator elects to continue the feed by so holding down the starter button. Thereafter selective measurement and automatic cycling may be resumed immediately, no characteristic clutch action of positive engagement or disengagement of any parts of the described continuously engaged friction drive being here required.

The manner of operation of the machine will be evident from the foregoing description in connection with the drawings. Noting Figs. 8, 11 and 12, when the finger 103 of the rotary trip member 93, moving proportionately with the tape length fed as measured by the upper feed roll 12, reaches a set-length tripping position such as shown dotted in Fig. 11, the micro-switch 106 is thereby closed to trip the start-stop switch 140, releasing the actuator solenoid 38, unless the latter is deliberately maintained by the operator as permitted by the clutch-measuring feature described. The upper feed roll 12 being thereupon separated from the driven feed roll 11 by forward spring-return of the actuator rod 45, the length-measuring trip member 93 is free to rotate reversely to the zero or starting position as shown in full lines in Fig. 11 and in Fig. 12, under the influence of its return spring 95. Such zero or starting position is determined by return abuttive engagement of the finger 103 against the fixed stop 104 on the machine, Figs. 11 and 12. The continuously engaged but yieldable friction drive arrangement as at 98—100 between the returnable driven part 93 and the measuring gear train 28—30 additionally affords a cushioning effect and allows coasting of the gears, as well as making possible the random length selection and the described elective additional length feed by holding down the starter-control switch. When preselected lengths are desired, under automatic cycling through feed, moistening, cut-off and delivery of the selected length, it is apparent that the starter-control switch button or plunger 135 is merely depressed and released, the cycle being carried out and ended automatically.

Figures 14, 15:
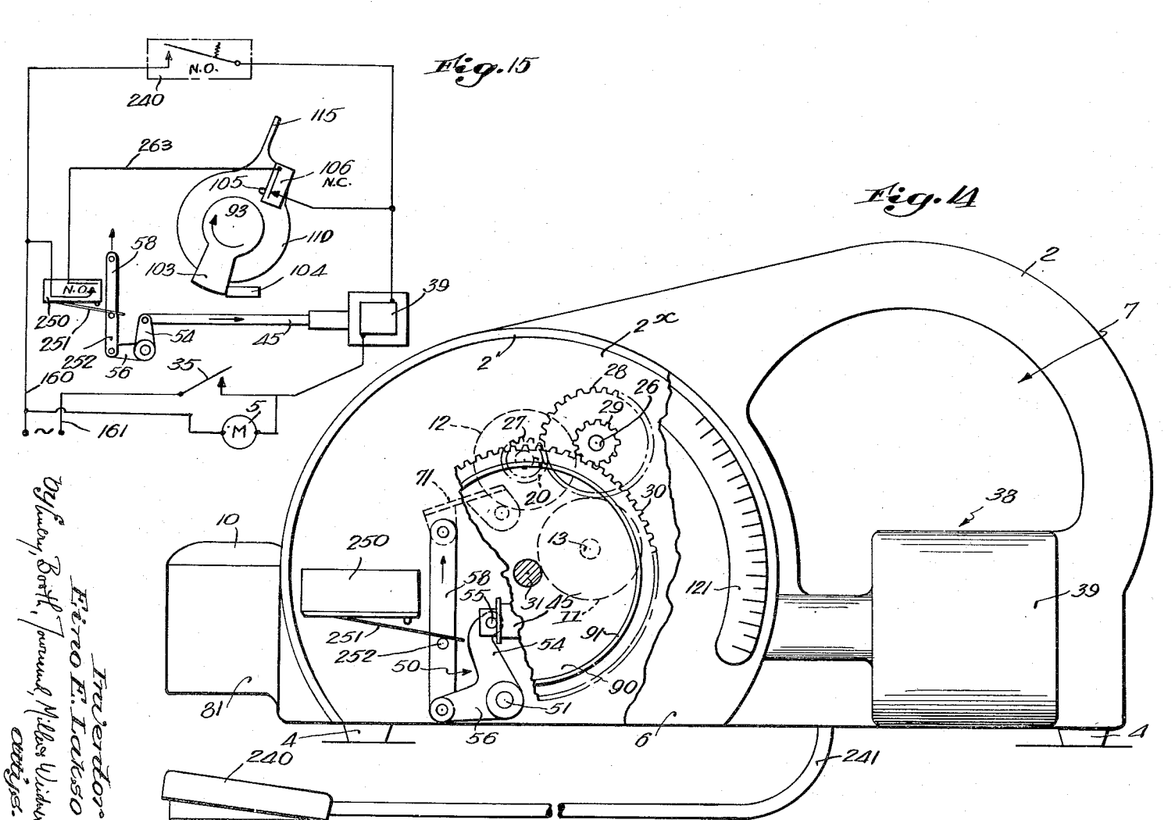
Fig. 14 is a right side elevation of a similar machine with modified control and circuit means, with the side cover broken away and the length selector removed.
Fig. 15 is a schematic wiring diagram for the Fig. 14 embodiment of the invention.

In Figs. 14 and 15 there is shown another embodiment of the invention differing from that of Figs. 1 to 13 mainly as to the control means, electric circuits and associated mechanism. Parts not otherwise referred to may be in general the same as shown and described in connection with the preceding views.

In Fig. 14 a portion of the right side cover plate 6 is broken away exposing the mechanism compartment 2x. In the latter is seen the train of tape-length measuring and trip-actuating gearing 27, 28, 29, 30. The feed rolls 11, 12 disposed between the machine side frames 1, 2 are indicated, the lower roll 11 being fixed on the motor-driven shaft 13 as previously. The stud shaft on which the large gear 30 and integral clutch-plate 90—91, the trip member 93 and the length-selector are rotatably mounted is shown in section at 31.

In this instance provision is made in association with the actuator 45 whereby a hold circuit is established immediately on energizing of the actuating solenoid 38 and attendant on the initial movement of the actuator or some part moved by or with the latter.

In lieu of the demountable starter box 130 and cam-held and electro-magnetically released switch-actuating detent device of the earlier figures, the machine is equipped with a starter-control switch 240 connected through a cord 241 of any desired length for positioning on, near or more or less remote from the machine as may be preferred, in series with the master switch 35, the actuator solenoid 38 and across the main supply leads 160, 161 similarly as in the earlier form; see wiring diagram Fig. 15 and compare Fig. 13.

At any convenient location on the machine where it may be actuated from and simultaneously with the main actuator rod 45, herein within the compartment 2x, is mounted a circuit-holding micro-switch 250 of the normally open type. The actuating finger 251 of this switch is disposed in the path of a part which is immediately moved in response to energizing of the main actuator solenoid 38. Conveniently and as shown in Fig. 14 a lateral pin 252 is installed on an adjacent member of the cutter linkage, herein the vertical link 58, which is directly mechanically connected to the actuator rod 45 through the bell crank 50. In the normal or inactive position of the parts as shown in Fig. 14, the solenoid 38 being de-energized, the pin 252 lies immediately against the switch finger 251, in readiness to actuate the latter and thereby close the normally-open switch 250 immediately on energizing of the solenoid 38 by closing depression by the operator of the normally-open starter-control switch 240. In this instance the cycle-terminating micro-switch 106 on the shiftable length-selector element 110 is of the normally closed type and as indicated in Fig. 15 its trip button 105 is adapted to be engaged by the trip member 93, in slip-clutch relation to the length-measuring mechanism as already described, thereby to open the normally-closed switch 106 and terminate the cycle on arrival of the selected feed length. As evident on the wiring diagram Fig. 15 the holding micro-switch 250 establishes a circuit between one of the lines 160 and through a connection 263 to the normally-closed trip switch 106 and thence through the actuator solenoid 38 and the master switch 35 to the other side of the line at 161.

The secondary or auxiliary circuit through the micro-switch 250 thus parallels the initial circuit containing the starter control switch 240 and in effect shunts across said main switch, permitting the latter to be released by the operator with but momentary depression, whenever a selected tape length and automatic cycling is desired. The actuator solenoid 38 accordingly remains in energized position to complete the feed, length-measuring, moistening, cut-off and delivery cycle without further attention on the part of the operator. As in the previous instance, the length selection may be shifted, even during a cycle, by moving the length setter 115 to a different location. And likewise whenever it is desired to obtain an indeterminate length, up to whatever the circumstances may require, the operator need but hold closed the starter switch 240.

By reason of the described parallel circuits the feed-roll-closing and knife-elevating actuator solenoid 38 will remain closed continuously with maintained closure of the selector control switch 240, independently of the cycle-terminating measured-length trip switch 106, as permitted by the friction drive feature incorporated in the length-measuring and cycle-terminating trip mechanism as already described in connection with Figs. 1 to 13.

My invention is not limited to the particular embodiments thereof illustrated and described herein, and I set forth its scope in my following claims.

I claim:

1. In a tape dispenser, separable rolls for feeding the tape, a motor to drive one of the rolls, tape measuring means operating with one of the rolls, a variably settable length selector, power-operated roll positioning means for relatively approaching the rolls to feeding relation and for separating them, an on-off control circuit for the roll positioning means, and means in the control circuit moving with the measuring means and coactive with the length selector to cause the roll positioning means to separate the rolls upon feeding of the tape length set by the selector.

2. In a tape dispensing machine, opposed rolls for feeding the tape, drive means for one roll, means supporting the other roll for closing and opening bodily movement to and from feeding relation, electro-magnetic means for closing and holding closed said movable roll to start and to continue the feed, automatic tape-length means controlled by the rotation of the movable roll for opening it to end a feed cycle, and length selector means for variably setting the tape-length means at the will of the operator.

3. In a tape dispenser, a pair of separable feed rolls, means to drive one roll, the other roll movable to and from feeding relation, electro-magnetic means to shift the movable roll to feed relation, tape length measuring means actuated by the movable roll, including a reduction gear train, a friction drive element rotatable thereby proportionately to the tape length fed, a trip member in friction driven relation to the said drive element, and a length selector element having a switch actuatable by the trip member to determine de-energization of the electro-magnetic means thereby to halt the feed.

4. In a tape dispenser, a pair of separable feed rolls, means to drive one roll, the other roll movable to and from feeding relation, electro-magnetic means to shift the movable roll to feed relation, tape length measuring means actuated by the movable roll, selectively settable means including a switch operable by the measuring means to de-energize the electro-magnetic means thereby to release the movable roll for feed-stopping return out from feed relation, and a friction drive connection incorporated in the measuring means whereby random tape lengths may be fed by continued energization of the electro-magnetic means.

5. In a tape dispenser, driven and follower rolls in opposed relation for feeding tape between them, the follower roll mounted for closing and opening to and from feeding relation, an actuator for so moving the follower roll mounted for closing and opening to and from feeding relation, an actuator for so moving the follower roll, electro-magnetic means to operate the actuator in the roll closing direction, a starter-control switch to energize the electro-magneic means, a stop switch and length-selector element variably settable for predetermined tape lengths, and length-measuring means moving with the follower roll and including a trip member engageable with the stop switch to de-energize the electro-magnetic means to open the rolls and halt the feed.

6. In a tape dispenser, driven and follower rolls in opposed relation for feeding tape between them, the follower roll mounted for closing and opening to and from feeding relation, an actuator for so moving the follower roll, electro-magnetic means to operate the actuator in the roll closing direction, a starter-control switch to energize the electro-magnetic means, a stop switch and length-selector element variably settable for predetermined tape lengths, electro-mechanical means for maintaining the energized status of the electro-magnetic means following closing operation and opening release of the starter-control switch by the operator, and a trip member moving with the follower roll proportionately to the length of tape fed thereat and adapted to operate the stop switch to release the electro-mechanical means and de-energize the electro-magnetic means upon feed of the predetermined length set.

7. In a tape dispenser, driven and follower rolls in opposed relation for feeding tape between them, the follower roll mounted for closing and opening to and from feeding relation, an actuator for so moving the follower roll, electro-magnetic means to operate the actuator in the roll closing direction, a starter-control switch to energize the electro-magnetic means, a stop switch and length-selector element variably settable for predetermined tape lengths, electro-mechanical means for maintaining the energized status of the electro-magnetic means following closing operation and opening release of the starter-control switch by the operator, a trip member moving with the follower roll proportionately to the length of tape fed thereat and adapted to operate the stop switch to release the electro-mechanical means and de-energize the electro-magnetic means upon feed of the predetermined length set, and friction drive means between the trip member and the follower roll whereby indefinite and random lengths may be fed by maintained closure of the starter-control switch at the will of the operator.

8. A tape dispenser having separable motor-driven and follower feed rolls, spring returned electro-magnetic means to effect feeding engagement of the rolls, a circuit containing the electro-magnetic means and an operator-controlled starting switch, an auxiliary circuit for automatically maintaining energization of the electro-magnetic means, and feed length measuring and control means connected for operation by the follower roll to break the auxiliary circuit thereby to determine a length-measured operating cycle, including a movable breaker-actuating trip selectively positionable at any point between minimum and maximum limits thereby to afford universal length selection within the capacity range of the dispenser.

9. A tape dispenser according to claim 8 wherein the selectively positionable trip is constructed and arranged for movement by the operator independently of the length-measuring and control means thereby to render the length selection universally variable by the operator at all times and including actual progress of an operating cycle.

10. An electric motorized dispenser for tape from a roll supply comprising, in combination with a machine frame, a motor, a feed roll driven thereby, a follower roll peripherally driven by and in linear unison with the tape fed between said rolls, a carrier for one of the rolls to shift it to and from feeding relation with the other roll, spring-returned electro-magnetic means to shift the roll carrier to start and stop the feed, a rotary measuring element connected with the follower roll for angular movement proportioned to the tape length fed, control circuits containing said electro-magnetic means along with a starter switch, a circuit-holding device and a limit switch, actuator means for the limit switch comprising a spring-returned rotary reciprocating member, the limit switch being mounted with one of said members, drive connection between the rotary reciprocating member and the follower-roll-connected measuring element, and operator-controlled means for relatively adjusting the angular spacing of said reciprocating and switch-throwing members selectively to vary by any desired increment the angular travel of the reciprocating member for actuation of the limit switch thereby automatically to terminate a feed cycle at any desired feed length within the range of the dispenser.

11. An electric motorized dispenser according to claim 10 wherein the connection between the rotary reciprocating member and the follower-roll-connected measuring element comprises friction drive means enabling random feed lengths beyond any given automatically terminating setting, by closure of the starter switch maintained by and at the will of the operator.

12. An electric motorized dispenser according to claim 11 wherein the friction drive means comprises a shoe element and a circumferential element continuously engaged thereby, one of said elements movable with the rotary measuring element and the other with the rotary reciprocating member.

13. In a tape dispenser, feed rolls for advancing tape between them, said rolls adapted to be closed to and opened from feeding relation, drive means for continuously driving at least one roll, electrically controlled roll positioning means, means moving with one roll to measure the tape length fed and including a friction drive between it and said roll, variably positionable length selector means, a switch governing said roll positioning means and an actuator for said switch, one on the measuring means and the other on the selector means, said switch and actuator adapted to engage at a point in the cycle of operation of said measuring means and thereby to effect roll opening to stop the feed at a selected length, and a master circuit controlling said roll positioning means, said circuit including a manually controllable switch operable to render ineffective said first mentioned switch whereby said feed rolls may be retained in closed position so that feed lengths may be had beyond that for which the length selector means is set.

14. In a tape dispenser according to claim 13 the construction and arrangement wherein the length selector means is shiftable to change the length setting during and at any time-point in the cycle of the measuring means.

15. In a tape dispenser having rolls rotatable to feed the tape between them, said rolls adapted to be closed to and opened from feeding relation, a tape length measuring element having an actuator thereon and rotatable with one roll, variably positionable length selecting means, roll positioning means associated with said length selecting means and cooperating with said actuator at a predetermined point in the operating cycle of said measuring element to open the rolls, and manually controlled means operable to render ineffective the operation of said roll positioning means responsive to the actuator whereby said feed rolls may be retained in closed position to continue the feed for indefinite lengths.

16. In a tape dispenser according to claim 15, means for moving said measuring element with said one roll through a yieldable friction drive, and wherein said friction drive is rendered ineffective as the manually controlled means is operated.

References Cited in the file of this patent

UNITED STATES PATENTS

| | | |
|---|---|---|
| 1,345,811 | Tullis | July 6, 1920 |
| 1,732,635 | Chabot | Oct. 22, 1929 |
| 1,732,636 | Gautier et al. | Oct. 22, 1929 |
| 2,115,737 | Menschner | May 3, 1938 |
| 2,298,492 | Longfield | Oct. 13, 1942 |
| 2,346,194 | Sjostrom | Apr. 11, 1944 |
| 2,405,790 | Krueger | Aug. 13, 1946 |
| 2,408,363 | Beckman et al. | Oct. 1, 1946 |
| 2,655,372 | Hempel | Oct. 13, 1953 |